(12) United States Patent
Aoyama et al.

(10) Patent No.: US 6,968,212 B1
(45) Date of Patent: Nov. 22, 2005

(54) BASE STATION APPARATUS THAT DIRECTIVELY TRANSMITS A MODULATED PACKET SIGNAL TO A PRIORITY DESTINATION AND PACKET TRANSMISSION METHOD THERETO

(75) Inventors: Takahisa Aoyama, Yokosuka (JP); Kenichi Miyoshi, Yokohama (JP); Toyoki Ue, Yokosuka (JP)

(73) Assignee: Matsushita Electric Industrial CO, Ltd., Osaka (JP)

( * ) Notice: Subject to any disclaimer, the term of this patent is extended or adjusted under 35 U.S.C. 154(b) by 460 days.

(21) Appl. No.: 10/031,873

(22) PCT Filed: May 23, 2001

(86) PCT No.: PCT/JP01/04305

§ 371 (c)(1),
(2), (4) Date: Jan. 24, 2002

(87) PCT Pub. No.: WO01/91332

PCT Pub. Date: Nov. 29, 2001

(30) Foreign Application Priority Data

May 26, 2000 (JP) .............................. 2000-156895

(51) Int. Cl.$^7$ ............................................. H04B 1/38
(52) U.S. Cl. ................ 455/562.1; 455/561; 455/575.7; 342/367
(58) Field of Search ............................ 455/562.1, 561, 455/575.1, 550.1, 13.3, 63.1, 575.7, 121, 455/129, 275, 63.2, 527, 403, 522, 422.1, 455/272, 560, 446, 101, 436, 440, 434, 435.3, 455/63.4, 65, 453, 69, 66.1, 67.11, 456.1, 455/454.2, 456.5, 456.3, 456.6, 424, 425, 455/426.1, 426.2, 432.1, 95, 62; 342/352, 342/354, 357.01, 357.06, 357.1, 368, 367; 370/465, 468, 318, 338, 333, 329, 208; 343/799, 343/800, 810–820

(56) References Cited

U.S. PATENT DOCUMENTS 5,732,075 A 3/1998 Tangemann et al.
6,483,819 B1 11/2002 Take et al.

(Continued)

FOREIGN PATENT DOCUMENTS

JP 07087011 3/1995

(Continued)

OTHER PUBLICATIONS

Japanese Office Action dated Feb. 15, 2005 in English.

Primary Examiner—Edward F. Urban
Assistant Examiner—Charles Chow
(74) Attorney, Agent, or Firm—Stevens, Davis, Miller & Mosher, LLP

(57) ABSTRACT

Priority determining section 107 determines priority of each communication terminal apparatus based on the information indicating the channel quality of the downlink. Transmission destination determining section 108 estimates the direction in which each communication terminal apparatus exists from the information indicating the direction of arrival of the signal and determines the communication terminal apparatuses to which downlink high-speed packet transmission is performed based on the direction in which each communication terminal apparatus exists and priority. AAA transmission control section 154 calculates a transmission weight based on the direction of arrival of the signal sent from the communication terminal apparatus determined by transmission destination determining section 108. Then, AAA transmission control section 154 multiplies the signals sent from antenna elements 101 to 103 by transmission weights. When adaptive array is used, this makes it possible to carry out effective downlink high-speed packet transmission.

12 Claims, 9 Drawing Sheets

U.S. PATENT DOCUMENTS

| | | | |
|---|---|---|---|
| 6,542,736 B1 * | 4/2003 | Parkvall et al. | 370/465 |
| 6,718,161 B1 * | 4/2004 | Westall et al. | 455/12.1 |
| 6,728,554 B1 * | 4/2004 | Wegner | 455/562.1 |
| 2001/0031647 A1 * | 10/2001 | Scherzer et al. | 455/562 |
| 2001/0055287 A1 * | 12/2001 | Sawada et al. | 370/329 |
| 2002/0034967 A1 * | 3/2002 | Taniguchi et al. | 455/562 |
| 2002/0039355 A1 * | 4/2002 | Yun et al. | 370/318 |
| 2002/0039912 A1 * | 4/2002 | Yamaguchi et al. | 455/561 |
| 2002/0115466 A1 * | 8/2002 | Kanemoto et al. | 455/522 |
| 2002/0137538 A1 * | 9/2002 | Chen et al. | 455/550 |

FOREIGN PATENT DOCUMENTS

| | | |
|---|---|---|
| JP | 7087011 | 3/1995 |
| JP | 8265837 | 10/1996 |
| JP | 9093178 | 4/1997 |
| JP | 9200282 | 7/1997 |
| JP | 10056420 | 2/1998 |
| JP | 11215049 | 8/1999 |
| JP | 11251964 | 9/1999 |
| JP | 11252614 | 9/1999 |
| JP | 11298954 | 10/1999 |
| JP | 11355374 | 12/1999 |
| JP | 2000008364 | 1/2000 |
| JP | 2000022618 | 1/2000 |
| JP | 200092545 | 3/2000 |
| JP | 2000115190 | 4/2000 |
| WO | 0021221 | 4/2000 |

* cited by examiner

| PRIORITY | 1 | 2 | 3 | 4 | 5 | 6 | 7 | 8 | 9 |
|---|---|---|---|---|---|---|---|---|---|
| MS | 201 | 202 | 207 | 208 | 205 | 203 | 204 | 209 | 206 |

FIG.3

BASE STATION APPARATUS THAT DIRECTIVELY TRANSMITS A MODULATED PACKET SIGNAL TO A PRIORITY DESTINATION AND PACKET TRANSMISSION METHOD THERETO

TECHNICAL FIELD

The present invention relates to a base station apparatus and packet transmission method used in a CDMA radio communication system.

BACKGROUND ART

In a CDMA radio communication system, a system to perform downlink high-speed packet transmission to users using a channel such as DSCH (Down link Shared CHannel) is proposed so that a base station (BS) downloads high-volume data to a communication terminal apparatus (TS) in a short time. This system will be explained using FIG. 1 below. FIG. 1 shows a configuration of a conventional radio communication system.

In FIG. 1, suppose base station apparatus 11 is currently conducting bi-directional radio communications with communication terminal apparatuses 21 to 23 using a communication channel (DPCH). In this case, communication terminal apparatuses 21 to 23 send information indicating the channel quality of the downlink to base station apparatus 11. The information indicating the channel quality includes SIR, etc.

Base station apparatus 11 sends packet signals to a communication terminal apparatus (e.g., communication terminal apparatus 21) which is selected based on the channel quality, etc. using DSCH. However, since high-speed packet transmission involves large transmit power and causes interference with other stations, this conventional base station apparatus adopts a time-division system and sends a packet signal to only one station at a time.

Here, the CDMA radio communication system may use adaptive array for the purpose of reducing interference. Adaptive array is a system to carry out transmission with directivity by mounting an array antenna made up of a plurality of antenna elements on a base station apparatus and sending transmission signals multiplied by complex coefficients (hereinafter referred to as "weights").

Using adaptive array for downlink high-speed packet transmission reduces interference, and therefore use of adaptive array is expected to allow downlink high-speed packet transmission to be carried out to a plurality of users simultaneously.

However, in a CDMA radio communication systems using adaptive array, no method has been disclosed so far as the method capable of effectively performing downlink high-speed packet transmission.

DISCLOSURE OF INVENTION

It is an object of the present invention to provide a base station apparatus and packet transmission method, when adaptive array is used, capable of performing downlink high-speed packet transmission simultaneously to a plurality of users having little interference with each other.

This object is attained by selecting a plurality of users having little interference with each other with consideration given to the positional relationship among communication terminal apparatuses, forms of directivity patterns, directivity width and channel quality of each directivity, etc.

BRIEF DESCRIPTION OF DRAWINGS

FIG. 3 illustrates an example of a priority table determined by a priority determining section of the base station apparatus according to the above embodiment;

BEST MODE FOR CARRYING OUT THE INVENTION

With reference now to the attached drawings, embodiments of the present invention will be explained in detail below.

Embodiment 1

Figure 1:
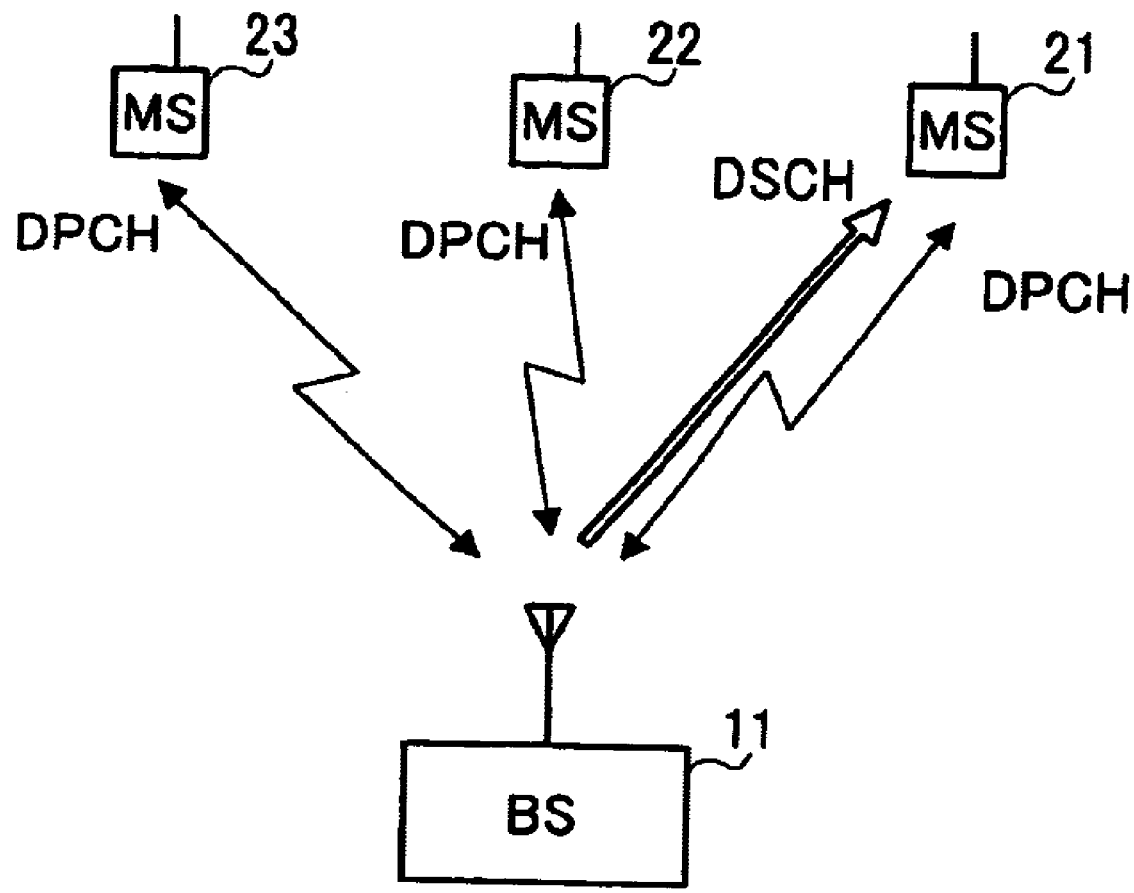
FIG. 1 illustrates a configuration of a conventional radio communication system.
Figure 2:
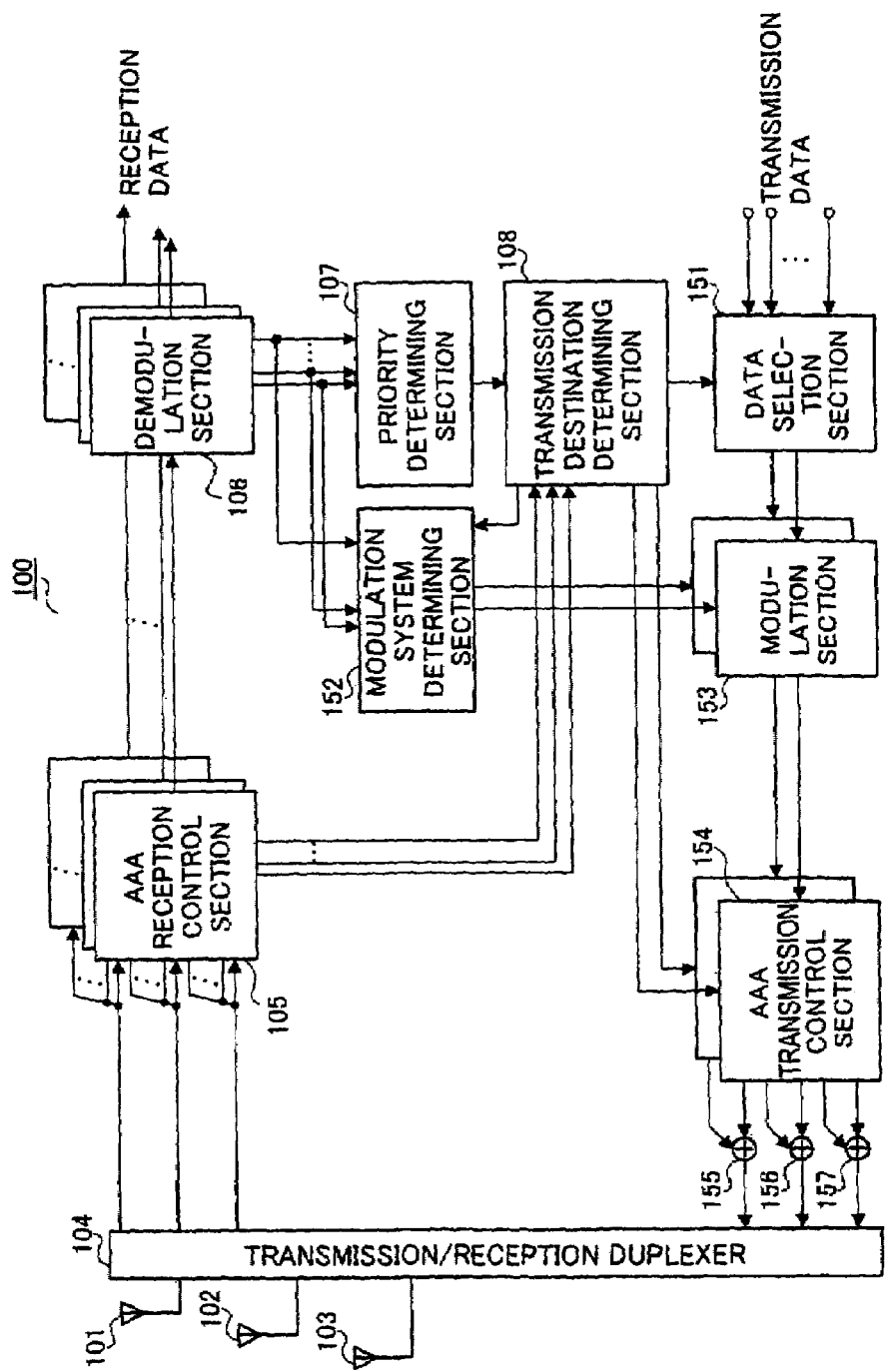
FIG. 2 is a block diagram showing a configuration of a base station apparatus according to Embodiment 1 of the present invention.

FIG. 2 is a block diagram showing a configuration of base station apparatus 100 according to Embodiment 1 of the present invention.

In FIG. 2, base station apparatus 100 is provided with antenna elements 101 to 103 that make up an array antenna, transmission/reception duplexer 104, AAA (adaptive array antenna) reception control section 105, demodulation section 106, priority determining section 107 and transmission destination determining section 108. Base station apparatus 100 is further provided with data selection section 151, modulation system determining section 152, modulation section 153, AAA transmission control section 154 and adders 155 to 157 corresponding to antenna elements 101 to 103.

Transmission/reception duplexer 104 carries out frequency conversion processing and amplification processing on signals received by antenna elements 101 to 103 and outputs the signals to AAA reception control section 105. Transmission/reception duplexer 104 also carries out frequency conversion processing and amplification processing on signals output from adders 155 to 157 and sends the signals by radio from antenna elements 101 to 103.

As many AAA reception control sections 105 are provided as there are communication terminal apparatuses with which radio communications are performed and carry out despreading on the output signal from transmission/reception duplexer 104, carry out direction of arrival estimation processing on the despread signal, calculate a reception weight and perform array combination on the despread signal. Then, AAA reception control sections 105 output the signals after the array combination to demodulation section 106 and output the information indicating the direction of arrival of the signal to transmission destination determining section 108.

As many demodulation sections 106 are provided as there are communication terminal apparatuses with which radio communications are performed and demodulate data of the signals array-combined by AAA reception control sections 105. Then, demodulation sections 106 separate information indicating the channel quality of the downlink from the demodulated signal and output to priority determining section 107 and modulation system determining section 152.

Priority determining section 107 determines priority of each communication terminal apparatus based on the information indicating the channel quality of the downlink. For example, the higher the channel quality of the downlink of a communication terminal apparatus, the higher priority is given thereto. Then, priority determining section 107 outputs the information indicating the determined priority to transmission destination determining section 108.

Transmission destination determining section 108 estimates the direction in which each communication terminal apparatus exists from the information indicating the direction of arrival of the signal and determines the order of communication terminal apparatuses to which downlink high-speed packets are sent based on the direction in which each communication terminal apparatus exists and priority. This is called "scheduling".

Then, transmission destination determining section 108 outputs the information indicating the determined communication terminal apparatus to data selection section 151 and modulation system determining section 152. Furthermore, transmission destination determining section 108 outputs the information indicating the direction of arrival of the signal sent from the determined communication terminal apparatus to AAA transmission control section 154. Details of the scheduling in transmission destination determining section 108 will be described later.

Data selection section 151 selects only the transmission data of the corresponding communication terminal apparatus based on the determination by transmission destination determining section 108 and outputs to modulation section 153.

Modulation system determining section 152 determines the data modulation system for carrying out downlink high-speed packet transmission based on the information indicating the channel quality of the downlink. For example, modulation system determining section 152 selects a high-speed rate modulation system such as 16QAM and 64QAM when the channel quality of the downlink is good and selects a low-speed rate modulation system such as QPSK when the channel quality of the downlink is poor. Then, modulation system determining section 152 instructs modulation section 153 about the modulation system.

As many modulation sections 153 are provided as there are data pieces that can be simultaneously sent through downlink high-speed packet transmission, and modulate and spread the output signal of data selection section 151 according to the modulation system instructed by modulation system determining section 152. Modulation section 153 outputs the spread signal to AAA transmission control section 154. By the way, the number of data pieces that can be simultaneously sent through downlink high-speed packet transmission is predetermined according to the number of spreading codes, etc.

As many AAA transmission control sections 154 are provided as there are data pieces that can be simultaneously sent through downlink high-speed packet transmission and calculate a transmission weight based on the direction of arrival of the signal sent from the communication terminal apparatus determined by transmission destination determining section 108. Then, AAA transmission control sections 154 generate signals to be sent from antenna elements 101 to 103 by multiplying the transmission signals by transmission weights and output to adders 155 to 157. By the way, the spreading processing for spreading transmission signals using spreading codes can be performed either before multiplying transmission weights or after multiplying transmission weights.

Of signals output from AAA transmission control sections 154 and to be sent to the respective communication terminal apparatuses, adder 155 adds up signals corresponding to antenna element 101 and outputs the addition result to transmission/reception duplexer 104. Of signals output from AAA transmission control sections 154 and to be sent to the respective communication terminal apparatuses, adder 156 adds up signals corresponding to antenna element 102 and outputs the addition result to transmission/reception duplexer 104. Of signals output from AAA transmission control sections 154 and to be sent to the respective communication terminal apparatuses, adder 157 adds up signals corresponding to antenna element 103 and outputs the addition result to transmission/reception duplexer 104.

Though not shown in FIG. 2, base station apparatus 100 is provided with modulation sections and AAA transmission control sections that send signals to the respective communication terminal apparatuses using DPCH, corresponding in number to the communication terminal apparatuses.

Then, the scheduling at transmission destination determining section 108 will be explained more specifically using FIG. 3 and FIG. 4. Suppose base station apparatus 100 is currently carrying out radio communications with nine communication terminal apparatuses (MS) 201 to 209.

FIG. 3 illustrates an example of a priority table determined by priority determining section 107. In the case of FIG. 3, transmission destination determining section 108 selects MS201 with the highest priority first as the destination of downlink high-speed packet transmission.

Figure 4:
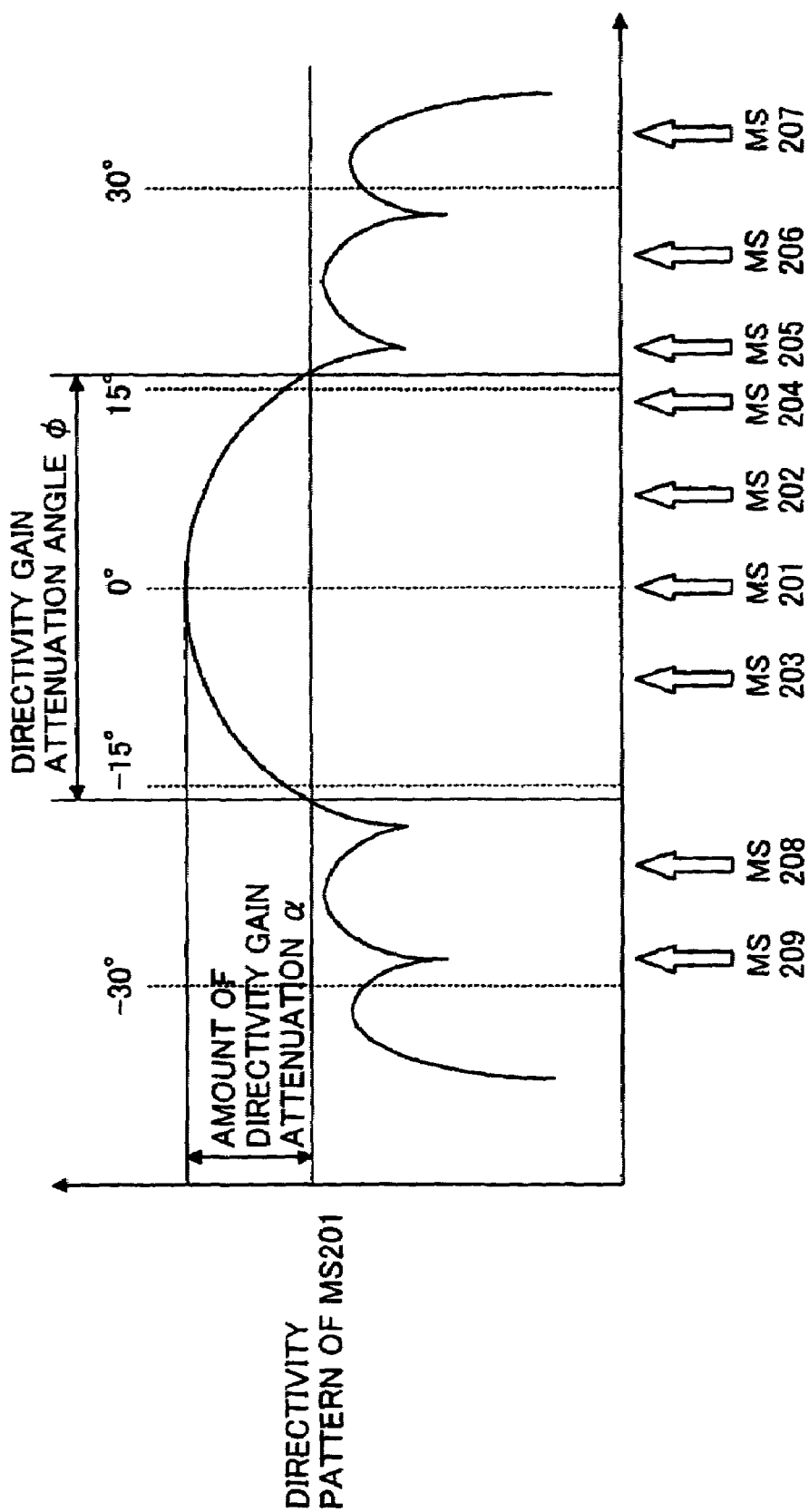
FIG. 4 illustrates directivity patterns of the base station apparatus according to the above embodiment.

FIG. 4 illustrates directivity patterns for MS201 of base station apparatus 100. In FIG. 4, the horizontal axis denotes the angle from the direction in which MS201 exists, the angle of which is assumed to be 0° and the vertical axis denotes a directivity gain. Furthermore, when a transmission signal toward MS201 is considered as interference, the amount of attenuation of directivity gain $\alpha$ in FIG. 4 is the amount of attenuation of directivity gain that is required to allow communication even under the influence of this interference.

Since the directivity gain at each position is uniquely determined by the directivity pattern, the angle of attenuation of directivity gain $\phi$ corresponding to the amount of attenuation of directivity gain $\alpha$ is also determined uniquely. Since the communication terminal apparatuses existing within the range of the angle of attenuation of directivity gain $\phi$ are affected greatly by signals sent to MS201, those communication terminal apparatuses are excluded from among the targets of downlink high-speed packet transmission.

For example, in the case of FIG. 4, transmission destination determining section 108 excludes MS202, 203 and 204 within the range of the angle of attenuation of directivity gain $\phi$ as the targets of downlink high-speed packet transmission and selects MS207 with the highest priority from among the remaining communication terminal apparatuses as the destination of downlink high-speed packet transmission with reference to the priority table in FIG. 3.

As shown above, by selecting a communication terminal apparatus with the highest priority as the destination of downlink high-speed packet transmission and selecting the next communication terminal apparatus based on the directivity pattern corresponding to this communication terminal apparatus, it is possible, when using adaptive array, to carry out downlink high-speed packet transmission simultaneously to a plurality of users having less interference with each other.

This embodiment has described the case where the range of communication terminal apparatuses to which downlink high-speed packets can be sent simultaneously is specified based on the amount of attenuation of directivity gain as an example, but the present invention is not limited to this and it is also possible to specify the range of communication terminal apparatuses to which downlink high-speed packets can be sent simultaneously according to an absolute transmit power value when transmit power of the communication terminal apparatuses changes. That is, when the transmit power is small and the amount of interference is small, simultaneous transmission even in the same direction is possible. Moreover, this embodiment has shown the method of determining priority only based on the user channel quality, but the present invention is not limited to this, and it is also possible to determine priority considering other decision information in addition to the user channel quality. Furthermore, this embodiment estimates the direction of arrival of signals from the user using the direction of arrival estimation technology with an adaptive array antenna, but the present invention is not limited to this, and it is also possible to estimate the direction of arrival based on positional information, etc. received from the user.

Embodiment 2

Embodiment 2 will describe a case where communication terminal apparatuses are divided into several groups based on a positional relationship and transmission is performed with directivity formed group by group. A system for forming directivity group by group is described in detail in the Japanese Patent Application No. 2000-008364.

Figure 5:
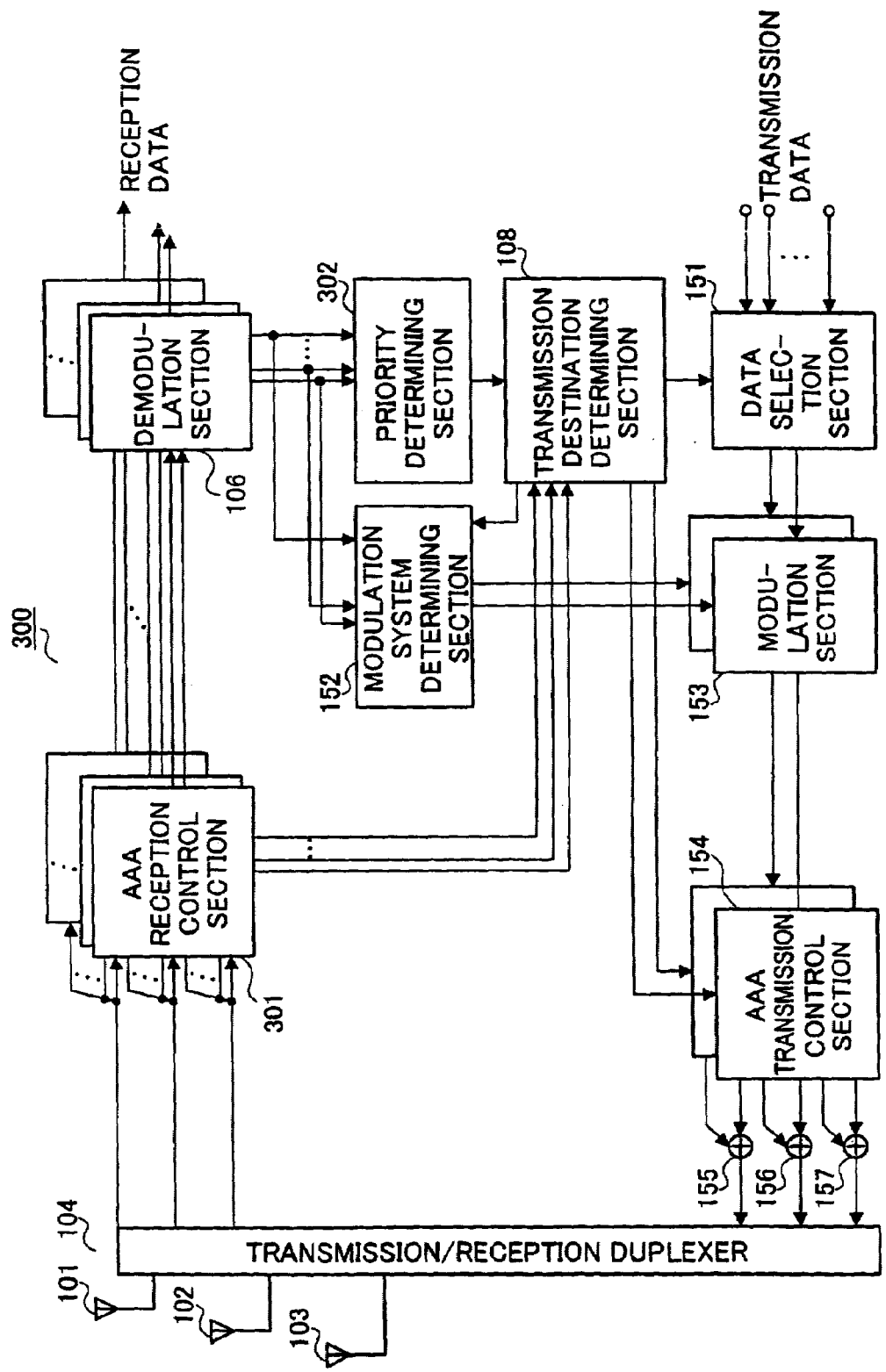
FIG. 5 is a block diagram showing a configuration of a base station apparatus according to Embodiment 2 of the present invention.

FIG. 5 is a block diagram showing a configuration of base station apparatus 300 according to this embodiment. The components of base station apparatus 300 shown in FIG. 5 common to those of base station apparatus 100 shown in FIG. 2 are assigned the same reference numerals as those in FIG. 2 and explanations thereof are omitted.

In base station apparatus 300 shown in FIG. 5, the operation of AAA reception control section 301 is different from AAA reception control section 105 of base station apparatus 100 and the operation of transmission destination determining section 302 is different from transmission destination determining section 108 of base station apparatus 100.

As many AAA reception control sections 301 are provided as there are directivity patterns and array combination is performed using a weight common within a same group. Then, AAA reception control sections 301 output information indicating communication terminal apparatuses that belong to each group to transmission destination determining section 302. AAA reception control sections 105 of Embodiment 1 carry out direction of arrival estimation for every communication terminal, and therefore carry out despreading prior to direction of arrival estimation, whereas this embodiment carries out direction of arrival estimation group by group, and therefore demodulation sections 106 carry out despreading processing after AAA reception control sections 301.

Transmission destination determining section 302 carries out scheduling based on information indicating communication terminal apparatuses that belong to each group and priority.

Figure 6:
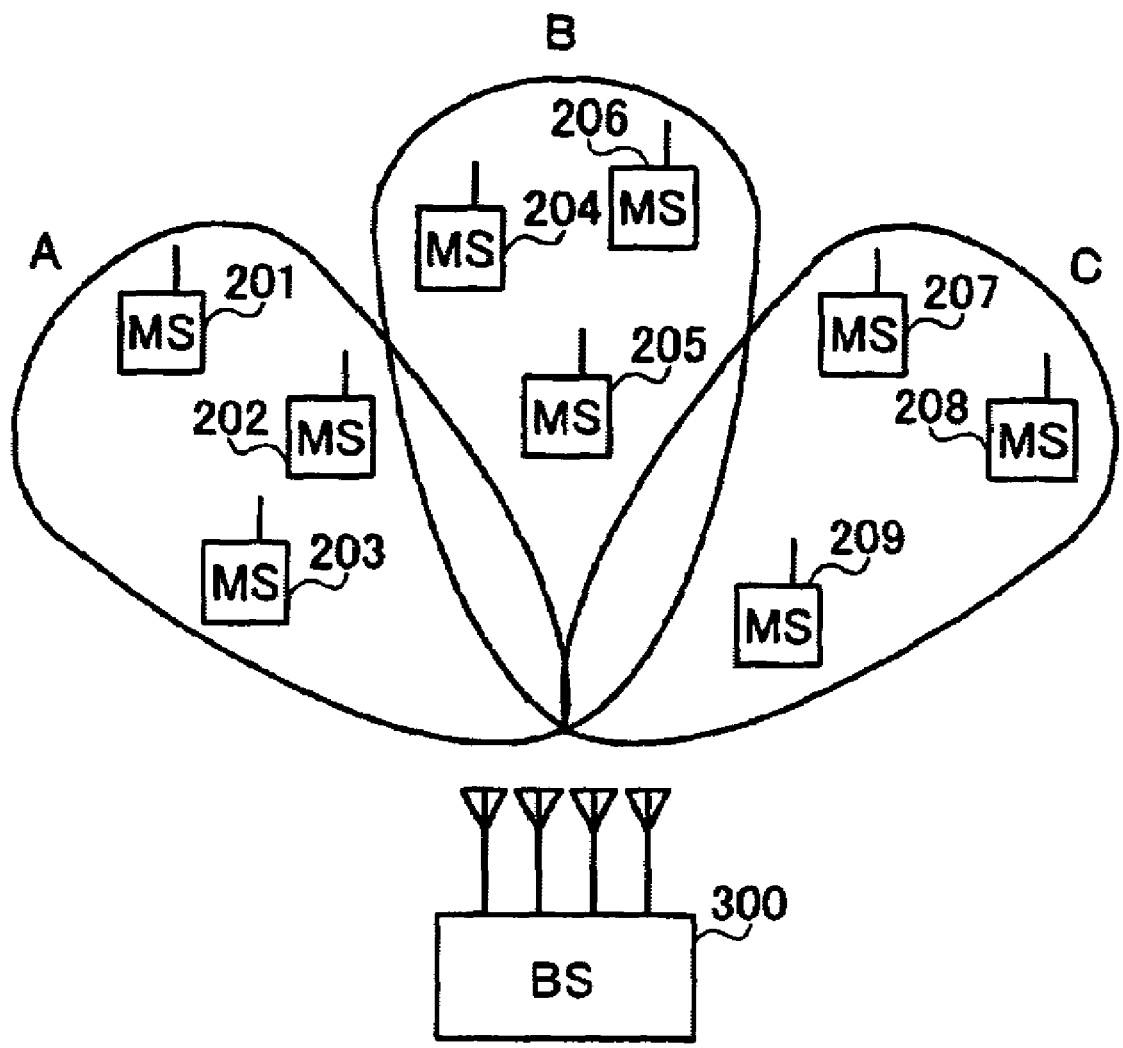
FIG. 6 illustrates directivity patterns of the base station apparatus according to the above embodiment.

As shown in FIG. 6, specific explanations of scheduling by transmission destination determining section 302 will be given below in the case where base station apparatus (BS) 300 carries out radio communications with communication terminal apparatuses (MS) 201 to 209 using three directivity patterns (A, B, C).

When the priority determined by priority determining section 107 is as shown in FIG. 3 above, transmission destination determining section 108 selects MS201 with the highest priority from among the communication terminal apparatuses that belong to group A. Likewise, transmission destination determining section 108 selects MS205 and MS207 with the highest priority from among the communication terminal apparatuses that belong to groups B and C, respectively.

Thus, by selecting a communication terminal apparatus with the highest priority in each group as the destination of downlink high-speed packet transmission, it is possible, when adaptive array is used, to carry out downlink high-speed packet transmission simultaneously to a plurality of users having little interference with each other.

Embodiment 3

Here, a high-speed rate modulation system such as 16QAM and 64QAM must carry out transmission with high power to achieve the same level of reception quality as that of a low-speed rate modulation system such as QPSK. For this reason, carrying out transmission according to a high-speed rate modulation system will increase interference with peripheral communication terminal apparatuses.

On the other hand, adaptive array can control directivity widths and narrowing the directivity widths makes it possible to reduce interference with peripheral communication terminal apparatuses.

Figure 7:
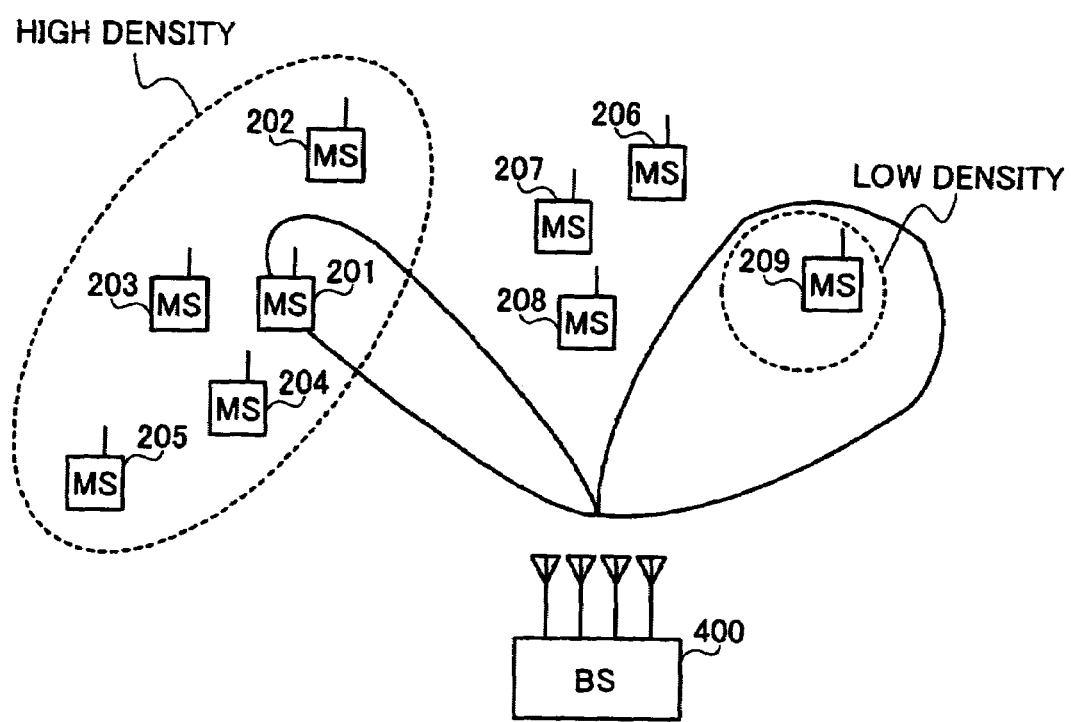
FIG. 7 illustrates directivity patterns of a base station apparatus according to Embodiment 3 of the present invention.

For example, as shown in FIG. 7, when base station apparatus 400 sends a signal to communication terminal apparatus (MS) 201 that exists in a high-density area, narrowing the directivity width makes it possible to reduce interference with peripheral communication terminal apparatuses. On the contrary, when base station apparatus 400 sends a signal to communication terminal apparatus (MS) 209 that exists in a low-density area, even widening the directivity width causes little interference with other communication terminal apparatuses.

Embodiment 3 will describe a case of controlling directivity widths considering this point.

Figure 8:
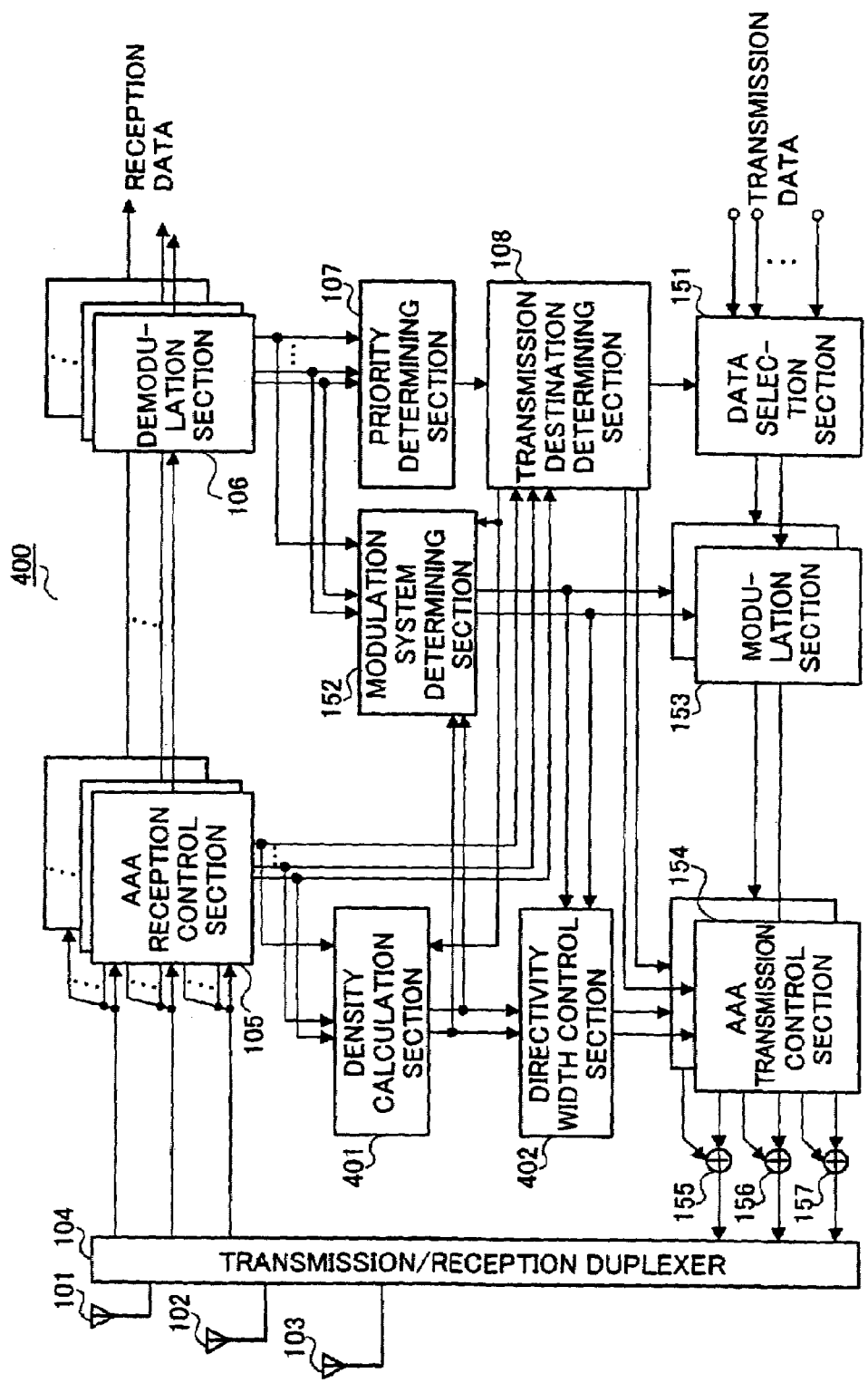
FIG. 8 is a block diagram showing a configuration of the base station apparatus according to the embodiment above.

FIG. 8 is a block diagram showing a configuration of base station apparatus 400 according to this embodiment. The components of base station apparatus 400 shown in FIG. 8 common to those of base station apparatus 100 shown in FIG. 2 are assigned the same reference numerals as those in FIG. 2 and explanations thereof are omitted.

Compared to base station apparatus 100 shown in FIG. 2, base station apparatus 400 shown in FIG. 8 has a configuration with density calculation section 401 and directivity width control section 402 added.

AAA reception control section 105 outputs information indicating the direction of arrival of a signal to transmission destination determining section 108 and density calculation section 401.

Transmission destination determining section 108 outputs the information indicating the determined communication terminal apparatus to data selection section 151, modulation system determining section 152 and density calculation section 401.

Density calculation section 401 calculates the density of the peripheral area of the communication terminal apparatus to which downlink high-speed packet transmission is performed based on the information indicating the direction of arrival of the signal. Then, density calculation section 401 outputs the calculated density to modulation system determining section 152 and directivity width control section 402.

Modulation system determining section 152 determines the data modulation system for carrying out downlink high-speed packet transmission based on the information indicating the channel quality of the downlink and density. For example, when the density of the peripheral area of the communication terminal apparatus to which downlink high-speed packet transmission is performed is low, interference with peripheral communication terminal apparatuses is small and downlink high-speed packet transmission can be performed with high power, and therefore modulation system determining section 152 adopts a higher rate modulation system. Then, modulation system determining section 152 outputs information indicating the determined modulation system to modulation section 153 and directivity width control section 402.

Directivity width control section 402 determines directivity widths based on the density and modulation system and controls the directivity width of AAA transmission control section 154. More specifically, despite using the same modulation system, directivity width control section 402 controls the directivity width so as to narrow the directivity width when transmitting signals to a communication terminal apparatus that exists in a high-density area, and widen the directivity width when transmitting signals to a communication terminal apparatus that exists in a low-density area. Furthermore, in the case where the density is about the same, directivity width control section 402 controls so as to narrow the directivity width when transmitting signals with a high-speed rate modulation system and widen the directivity width when transmitting signals with a low-speed rate modulation system.

Thus, by controlling directivity widths considering the density of the peripheral area and modulation system of a communication terminal apparatus to which downlink high-speed packet transmission is performed, it is possible to carry out more effective downlink high-speed packet transmission than Embodiment 1.

Embodiment 4

Embodiment 3 above has described the case where directivity widths are controlled considering the density and modulation system. However, estimating the direction of arrival of a signal requires averaging of the reception signal for a long period of time and carrying out transmission/reception with a narrow directivity width for a communication terminal apparatus which is moving fast prevents accurate estimation of the direction of arrival of the signal.

To solve this problem, Embodiment 4 will describe a case where directivity widths are controlled considering not only the density and modulation system but also the moving speed of a communication terminal apparatus.

Figure 9:
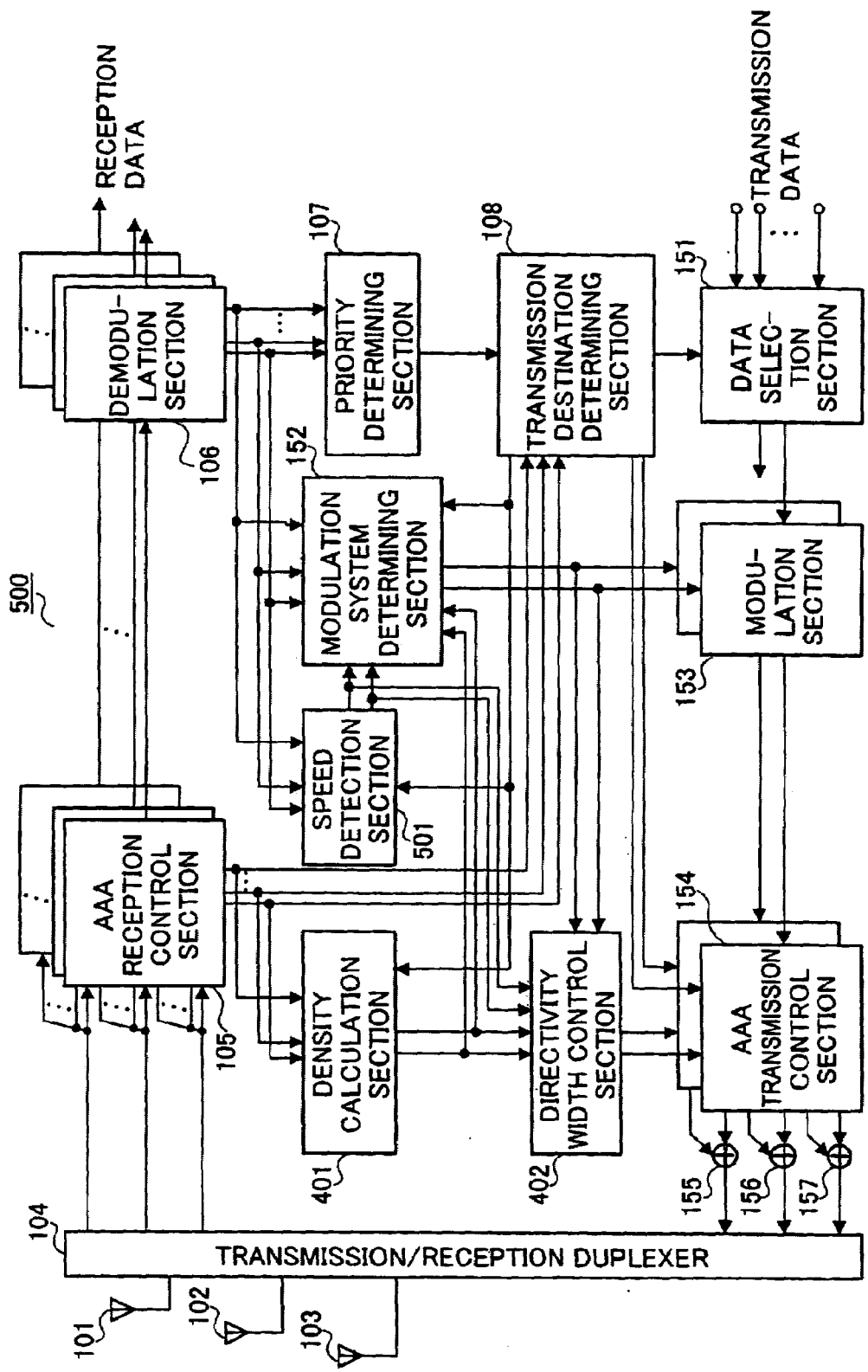
FIG. 9 is a block diagram showing a configuration of a base station apparatus according to Embodiment 4 of the present invention.

FIG. 9 is a block diagram showing a configuration of base station apparatus 500 according to this embodiment. The components of base station apparatus 500 shown in FIG. 9 common to those of base station apparatus 400 shown in FIG. 8 are assigned the same reference numerals as those in FIG. 8 and explanations thereof are omitted.

Compared to base station apparatus 400 shown in FIG. 8, base station apparatus 500 shown in FIG. 9 has a configuration with speed detection section 501 added.

AAA reception control section 105 outputs the reception signal after array combination to demodulation section 106 and speed detection section 501.

Transmission destination determining section 108 outputs the information indicating the determined communication terminal apparatus to data selection section 151, modulation system determining section 152, density calculation section 401 and speed detection section 501.

Speed detection section 501 detects the moving speed of the communication terminal apparatus to which downlink high-speed packet transmission is performed based on the reception signal after array combination and outputs the detected moving speed to modulation system determining section 152 and directivity width control section 402.

One of the methods for detecting the moving speed by speed detection section 501 is the one based on Doppler frequency. That is, speed detection section 501 measures the Doppler frequency of the reception signal, judges that the moving speed is high when the Doppler frequency is high and that the moving speed is low when the Doppler frequency is low.

Another method for detecting the moving speed by speed detection section 501 is the one based on weight tracking. In this case, AAA reception control section 105 also carries out AAA reception processing with directivity patterns shifted by $+\theta°$ and $-\theta°$ from the current directivity pattern and outputs the reception signals with the respective directivity patterns to speed detection section 501. Speed detection section 501 measures SIR of the reception signal with each directivity pattern and decides whether the communication terminal apparatus is moving or not based on the SIR measurement result. Speed detection section 501 calculates the moving speed of the communication terminal apparatus by totalizing these results.

Modulation system determining section 152 determines the data modulation system for carrying out downlink high-speed packet transmission based on not only the information indicating the channel quality of the downlink and density but also the speed. For example, when the moving speed of the communication terminal apparatus to which downlink high-speed packet transmission is performed is high, modulation system determining section 152 adopts a lower rate modulation system.

Directivity width control section 402 determines directivity widths based on not only the density and modulation system but also the speed and controls the directivity width of AAA transmission control section 154. For example, directivity width control section 402 controls the directivity width so as to widen the directivity width when the moving speed of the communication terminal apparatus to which downlink high-speed packet transmission is performed is high.

Thus, by controlling directivity widths considering not only the density and modulation system but also the moving speed of the communication terminal apparatus to which downlink high-speed packet transmission is performed, it is possible to carry out more effective downlink high-speed packet transmission than Embodiment 3.

As is apparent from the above-described explanations, the present invention selects a plurality of users having little interference with each other considering the positional relationship between communication terminal apparatuses, the number of directivity patterns, width of directivity and channel quality of each directivity, etc., and can thereby perform effective downlink high-speed packet transmission simultaneously to the plurality of users.

This application is based on the Japanese Patent Application No. 2000-156895 filed on May 26, 2000, entire content of which is expressly incorporated by reference herein.

INDUSTRIAL APPLICABILITY

The present invention is ideally applicable to a base station apparatus in a CDMA radio communication system.

What is claimed is:

1. A base station apparatus that performs downlink packet transmission using an adaptive array, said base station apparatus comprising:
a priority determiner that determines individual priorities of a plurality of communication terminal apparatuses in communication based on downlink channel quality;
a transmission destination determiner that determines a plurality of communication terminal apparatuses having less interference with each other than a predetermined level, including a communication terminal apparatus having a highest priority;
a modulation system determiner that determines a packet signal modulation system based on the downlink channel quality;
a directivity transmitter that modulates a packet signal by the modulation system determined in the modulation system determiner and transmits the modulated packet signal with directivity to the communication terminal apparatuses determined in the transmission destination determiner.

2. The base station apparatus according to claim 1, wherein the transmission destination determiner first selects the communication terminal apparatus having the highest priority and then selects a communication terminal apparatus having the highest priority among the remaining determined plurality of communication terminal apparatuses, excluding ones affected by the packet signal, sent to the first selected communication terminal apparatus, by more than a predetermined level.

3. The base station apparatus according to claim 1, wherein:
the directivity transmitter divides the determined plurality of communication terminal apparatuses into several groups and implements the transmission by forming the directivity on a per group basis, and
the transmission destination determiner selects in each group a communication terminal apparatus having the highest priority.

4. The base station apparatus according to claim 1, wherein the modulation system determiner adopts a higher rate modulation system as the channel quality of the downlink increases.

5. The base station apparatus according to claim 1, further comprising:
a density calculator that calculates a density in a peripheral area of a communication terminal apparatus determined in the transmission destination determiner; and
a directivity width controller that controls a directivity width based on the modulation system and the density, wherein
the modulation system determiner additionally determines the packet signal modulation system based on the density, and the directivity transmitter implements the transmission in accordance with the control provided by said directivity width controller.

6. The base station apparatus according to claim 5, wherein the modulation system determiner adopts a higher rate modulation system as the density calculated by the density calculator decreases.

7. The base station apparatus according to claim 5, wherein the directivity width controller controls the directivity width so that the directivity width becomes narrower for a higher rate modulation system.

8. The base station apparatus according to claim 5, wherein the directivity width controller controls the directivity width so that the directivity width becomes narrower as the density calculated by the density calculator increases.

9. The base station apparatus according to claim 5, further comprising:
a speed detector that detects a speed of a communication terminal apparatus determined in the transmission destination determiner, wherein
the modulation system determiner additionally determines the packet signal modulation system based on the speed and the directivity width controller additionally controls the directivity width based on the speed.

10. The base station apparatus according to claim 9, wherein the modulation system determiner adopts a lower rate modulation system as the speed detected by the speed detector increases.

11. The base station apparatus according to claim 9, wherein the directivity width controller controls the directivity width so that the directivity width becomes wider as the speed detected by the speed detector increases.

12. A packet transmission method for a base station apparatus that performs packet transmission using an adaptive array, said method comprising:
(i) determining individual priorities of a plurality of communication terminal apparatuses in communication based on downlink channel quality;
(ii) determining a plurality of communication terminal apparatuses having less interference with each other than a predetermined level, including a communication terminal apparatus having a highest priority;
(iii) determining a packet signal modulation system based on the downlink channel quality;
(iv) modulating a packet signal by the modulation system determined in step (iii);
(v) transmitting the modulated packet signal with directivity to the communication terminal apparatuses determined in step (ii).

* * * * *